United States Patent [19]
Lei

[11] Patent Number: 5,815,383
[45] Date of Patent: *Sep. 29, 1998

[54] HIGH VOLTAGE START-UP CIRCUIT AND METHOD THEREFOR

[75] Inventor: Jimes Lei, San Jose, Calif.

[73] Assignee: Supertex, Inc., Sunnyvale, Calif.

[ * ] Notice: The term of this patent shall not extend beyond the expiration date of Pat. No. 5,640,317.

[21] Appl. No.: 774,958

[22] Filed: Dec. 27, 1996

Related U.S. Application Data

[63] Continuation of Ser. No. 490,593, Jun. 15, 1995.

[51] Int. Cl.$^6$ ................................................. H02M 7/517
[52] U.S. Cl. .................................................. 363/49
[58] Field of Search ................................................. 363/49

[56] References Cited

U.S. PATENT DOCUMENTS

| | | | |
|---|---|---|---|
| Re. 34,462 | 11/1993 | Whittle | 363/49 |
| 4,236,198 | 11/1980 | Ohsawa et al. | 363/49 |
| 4,370,701 | 1/1983 | Western | 363/49 |
| 4,754,387 | 6/1988 | Konopka | 363/49 |
| 5,014,178 | 5/1991 | Balakrishnan | 363/49 |
| 5,282,126 | 1/1994 | Husgen | 363/49 |
| 5,285,369 | 2/1994 | Balakrishnan | 363/49 |
| 5,459,652 | 10/1995 | Faulk | 363/49 |
| 5,477,175 | 12/1995 | Tisinger et al. | 363/49 |
| 5,555,167 | 9/1996 | Fujihashi | 363/49 |
| 5,581,453 | 12/1996 | Ueta et al. | 363/49 |
| 5,640,317 | 6/1997 | Lei | 363/49 |

*Primary Examiner*—Jeffrey L. Sterrett
*Attorney, Agent, or Firm*—Harry M. Weiss; Jeffrey D. Moy; Harry M. Weiss & Associates, P.C.

[57] ABSTRACT

The present invention relates to a switchmode power supply (SMPS) high voltage start-up integrated circuit (IC) with output voltage sensing and output current limiting. The high voltage start-up IC allows low voltage pulse width modulated (PWM) controller ICs to operate directly off rectified AC lines of up to 450 VDC. The high voltage start-up IC allows PWM controller ICs to start-up with a start threshold larger than its operating voltage. The output voltage is monitored internally so that the internal high voltage switch turns off when the output voltage decreases below an internally set trip point voltage ($V_{off}$) The internal high voltage switch remains off and an external auxiliary voltage is generated and applied to the output voltage. If the output voltage falls below a lower set trip point voltage ($V_{reset}$) the internal high voltage switch turns back on. This allows the start-up circuit to reset itself when the PWM controller IC's auxiliary voltage does not power up properly.

15 Claims, 2 Drawing Sheets

5,815,383

HIGH VOLTAGE START-UP CIRCUIT AND METHOD THEREFOR

RELATED APPLICATIONS

This U.S. patent application is a continuation of U.S. patent application entitled "HIGH VOLTAGE START-UP CIRCUIT AND METHOD THEREFOR," Ser. No. 08/490,593, filed Jun. 15, 1995, in the name of the same Applicant as this U.S. patent application.

BACKGROUND OF THE INVENTION

1. Field of the Invention

This invention relates generally to switchmode power supplies (SMPS) and, more specifically, to a start-up integrated circuit (IC) for a SMPS operating from high input voltages ranging from 40 V to 450 V.

2. Description of the Prior Art

An off-line switchmode power supply (SMPS) accepts a rectified AC input voltage and converts and regulates it to various desired output DC voltages. Common AC voltage sources are nominally 90 VAC, 120 VAC, and 240 VAC. The conversion and regulation is accomplished by a pulse width modulated (PWM) controller integrated circuit (IC). The majority of PWM controller ICs will operate with a maximum input voltage of 30 V only. External circuitry is therefore required for the SMPS to operate directly off the rectified AC line. The external circuit is called the start-up circuit. The start-up circuit is only used during start-up of the SMPS. Once the SMPS is started, an auxiliary voltage is generated and is used to power up the PWM controller IC. A typical power resistor discrete implementation of the start-up circuit uses a power resistor, a capacitor, and a zener diode.

PWM controller ICs typically have 2 current ratings: start-up current and operating current. Start-up currents are typically less than 1.0 mA whereas the operating currents are typically less than 17 mA. When the SMPS is powered up, the PWM controller IC will draw no more than 1.0 mA when its $V_{cc}$ voltage is below its start threshold voltage. A typical start threshold voltage is 16 V. Once the $V_{cc}$ voltage becomes greater than the start threshold voltage, the PWM controller IC will typically draw 14 mA. The power resistor is selected such that it will provide the charging current for the external capacitor and the PWM controller IC's start-up circuit. The operating current is supplied by the capacitor across $V_{cc}$. The PWM controller IC will continue to operate until its $V_{cc}$ voltage falls below the minimum operating voltage rating, typically 10 V. An auxiliary voltage is applied to the $V_{cc}$ of the PWM controller IC. It is desirable to have the auxiliary voltage to be greater than 10 V before the $V_{cc}$ capacitor discharges below the minimum operating voltage. When the auxiliary voltage is greater than 10 V, it will provide the required operating current for the PWM controller IC.

The problem with the power resistor approach is that power is continuously being dissipated by the power resistor after start-up. The power dissipation will be worst if the same design is used for both 120 VAC and 240 VAC operation. The high voltage start-up circuit of the present invention solves this problem by dissipating very little power after start-up. The start-up circuit monitors the output voltage and determines whether the SMPS has started up. After start-up, it turns off its internal high voltage input line to minimize power dissipation. Power is therefore only dissipated during start-up. This allows the start-up IC to be packaged in a cost effective three (3) terminal package.

SUMMARY OF THE INVENTION

In accordance with one embodiment of the present invention, it is an object of this invention to provide an improved high voltage start-up circuit for a switchmode power supply and method therefor.

It is another object of the present invention to provide an improve start-up circuit and method therefor that will allow low voltage PWM controller ICs to be operated at considerably higher DC voltages.

It is still another object of the present invention to provide an improved start-up circuit and method therefor that will allow the PWM controller IC to be operated at a voltage below that of its threshold voltage after start-up.

It is still another object of the present invention to provide an improved start-up circuit and method therefor that allows the start-up circuit's high voltage input current to be turned off with a voltage value less than that of the start threshold voltage.

BRIEF DESCRIPTION OF THE PREFERRED EMBODIMENTS

In accordance with one embodiment of the present invention, a high voltage start-up circuit for a switchmode power supply is disclosed. The high voltage start-up circuit is comprised of switching means for turning off and on a high voltage input line of the start-up circuit and for limiting a current flow from the high voltage input line to an output of the start-up circuit. A first comparator means is coupled to the switching means for sending a signal to turn on the switching means when an output voltage of the start-up circuit falls below a first set value. A second comparator means is coupled to the switching means for sending a signal to turn off the switching means when the output voltage falls below a second set value.

In accordance with another embodiment of the present invention, a method for providing a high voltage start-up circuit for a switchmode power supply is disclosed. The method is comprised of the steps of: providing switching means for turning off and on a high voltage input line of the start-up circuit and for limiting a current flow from the high voltage input line to an output of the start-up circuit; providing first comparator means coupled to the switching means for sending a signal to turn on the switching means when an output voltage of the start-up circuit falls below a first set value; and providing second comparator means coupled to the switching means for sending a signal to turn off the switching means when the output voltage falls below a second set value.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
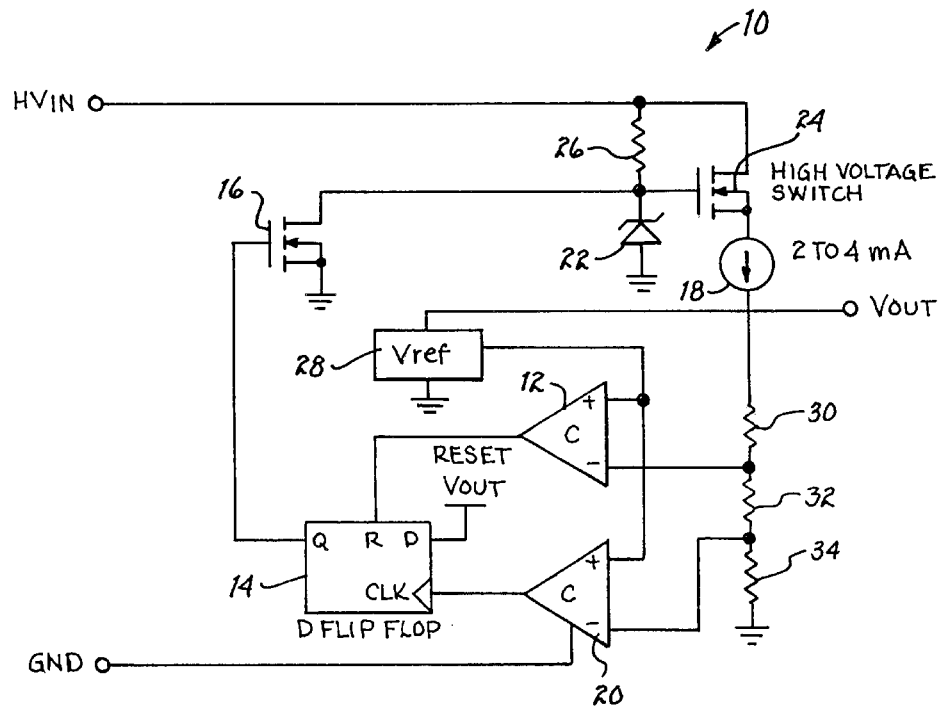
FIG. 1 is a simplified block diagram of the high voltage start-up circuit of the present invention.

Referring to FIG. 1, the high voltage start-up circuit 10 of the present invention is shown. When $V_{out}$ is typically less than 7.0 V, the comparator 12 will sense that $V_{out}$ is less than 7.0 V. The comparator's 12 output will then be at a logic high state thereby resetting the D flip flop 14. The D flip flop's 14 output (Q) will be at logic zero keeping the transistor 16 off.

$V_{out}$ will continue to increase at a current limit set by the internal constant current source 18, typically 3.0 mA. When $V_{out}$ reaches above 13.5 V, an output from a comparator 20 will switch from a logic high to a logic low. The D flip flop's 14 output does not change state since its clock input is designed to trigger on a rising edge. $V_{out}$ will stop increasing once it reaches a maximum voltage $V_{max}$ which is equal to the voltage across the zener diode 22 minus the threshold voltage of the transistor 24. The zener diode 22 is biased by a resistor 26. The internal voltage reference ($V_{ref}$) 28, and the resistor dividers 30, 32, and 34 set the $V_{out}$ trip points for the comparators 12 and 20. In the preferred embodiment of the present invention, the internal voltage reference 28 and the resistor dividers 30, 32, and 34 are set to have $V_{out}$ trip points of about 7.0 V and 13.5 V for the comparators 12 and 20.

$V_{out}$ will start to decrease when it is loaded down with an external load greater than the internal constant current source 18. When $V_{out}$ falls below 13.5 V, the output of the comparator 20 will switch from a logic low to a logic high. The output of the comparator 20 will clock in a logic one (1) into the D flip flop 14 causing the D flip flop's 14 output to a logic high. Transistor 16 will then turn on pulling the gate of the transistor 24 to ground thereby turning off the transistor 24.

Figure 2:
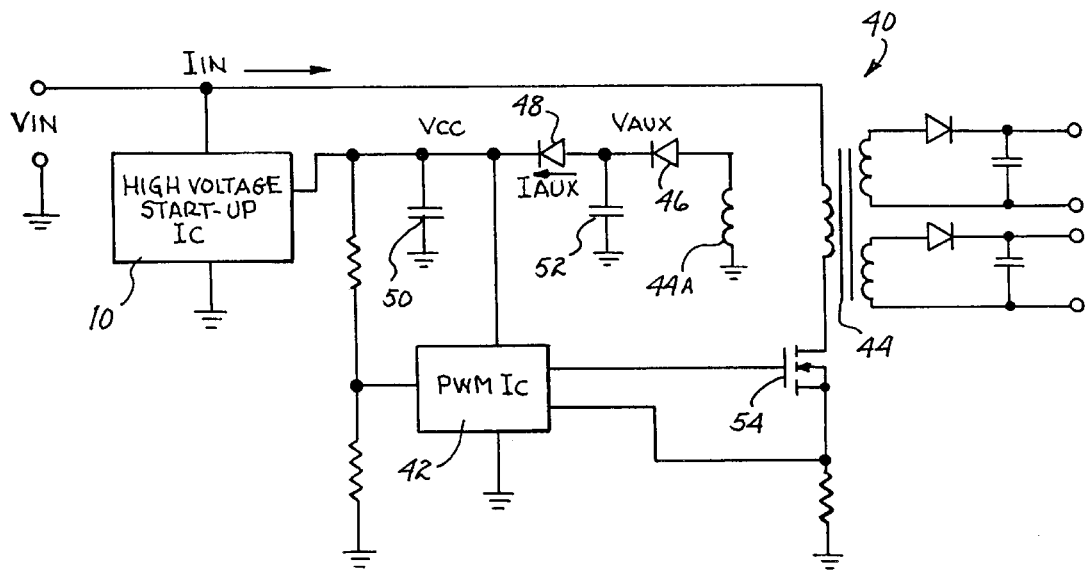
FIG. 2 is a simplified block diagram of the high voltage start-up circuit of FIG. 1 integrated into a switchmode power supply.

Referring to FIG. 2, a configuration of a SMPS 40 using the high voltage start-up circuit 10 of the present invention. The high voltage start-up circuit's 10 $V_{out}$ terminal is connected to the $V_{cc}$ line of the pulse width modulated (PWM) controller IC 42. An auxiliary winding 44A on the transformer 44 is used to generate a $V_{cc}$ voltage to power the PWM controller IC 42 after start-up. The auxiliary winding 44A is connected to the $V_{cc}$ line via diodes 46 and 48.

The diode 48 and the capacitor 50 are used in applications where the auxiliary voltage must use a large capacitance value for capacitor 52. Without the diode 48 and the capacitor 50, a large amount of time will be required to charge the capacitor 52 since the output is current limited. The use of the diode 48 will block the flow of current going into the capacitor 52. The capacitor 50 must be at a much lower value than that of capacitor 52. This will allow the power supply to start-up faster.

During power up, the high voltage start-up circuit 10 will start to charge the capacitor 50 on the PWM controller IC 42. The $V_{cc}$ voltage will begin to rise. When $V_{cc}$ is between 0 and 7 V, a reset signal is generated clearing an internal latch. Once the $V_{cc}$ voltage rises above 7 V, the reset signal is disabled. The $V_{cc}$ voltage will continue to rise until it reaches the PWM controller IC's 42 start threshold voltage, typically 16 V.

The PWM controller IC 42 will typically draw 0.5 mA from its $V_{cc}$ line during start-up. Once $V_{cc}$ reaches typically 16 V, the PWM controller IC 42 will draw 14 mA and is considered to be in its operating mode. Since the start-up circuit can only supply a maximum current of 2 to 4 mA, the PWM controller IC 42 will start discharging the capacitor 50. When in its operating mode, the PWM controller IC 42 can be operated with a minimum $V_{cc}$ voltage of typically 10 V.

Once $V_{cc}$ falls below 13.5 V, a latch in the high voltage start-up circuit 10 will clock in a logic high. This turns off a high voltage input line of the high voltage start-up circuit 10. At this point, there is no current flowing from the high voltage input line on the high voltage start-up circuit 10. $V_{cc}$ will continue to decrease until the voltage generated from the auxiliary winding reaches typically 10 V.

If the SMPS 40 is properly designed, the auxiliary voltage will supply the required $V_{cc}$ current for the PWM controller IC 42. If for some reason the auxiliary voltage does not reach 10 V, the $V_{cc}$ voltage will continue to decrease. When $V_{cc}$ falls below the PWM controller IC's 42 minimum operating voltage, the PWM controller IC will go back into its start-up mode and will draw only 0.5 mA. Since the start-up circuit is still off, the $V_{cc}$ voltage will continue to decrease but at a much slower rate. When $V_{cc}$ falls below 7 V, the high voltage start-up circuit 10 will generate a reset signal and clears the internal latch thereby turning back on the high voltage line.

A switching transistor 54 is coupled to the transformer 44 and the PWM controller IC 42. The switching transistor 54 is used to charge the primary of the transformer 44. The PWM controller IC will vary its pulse width depending on what the input voltage and output loads are to maintain voltage regulation.

Figure 3:
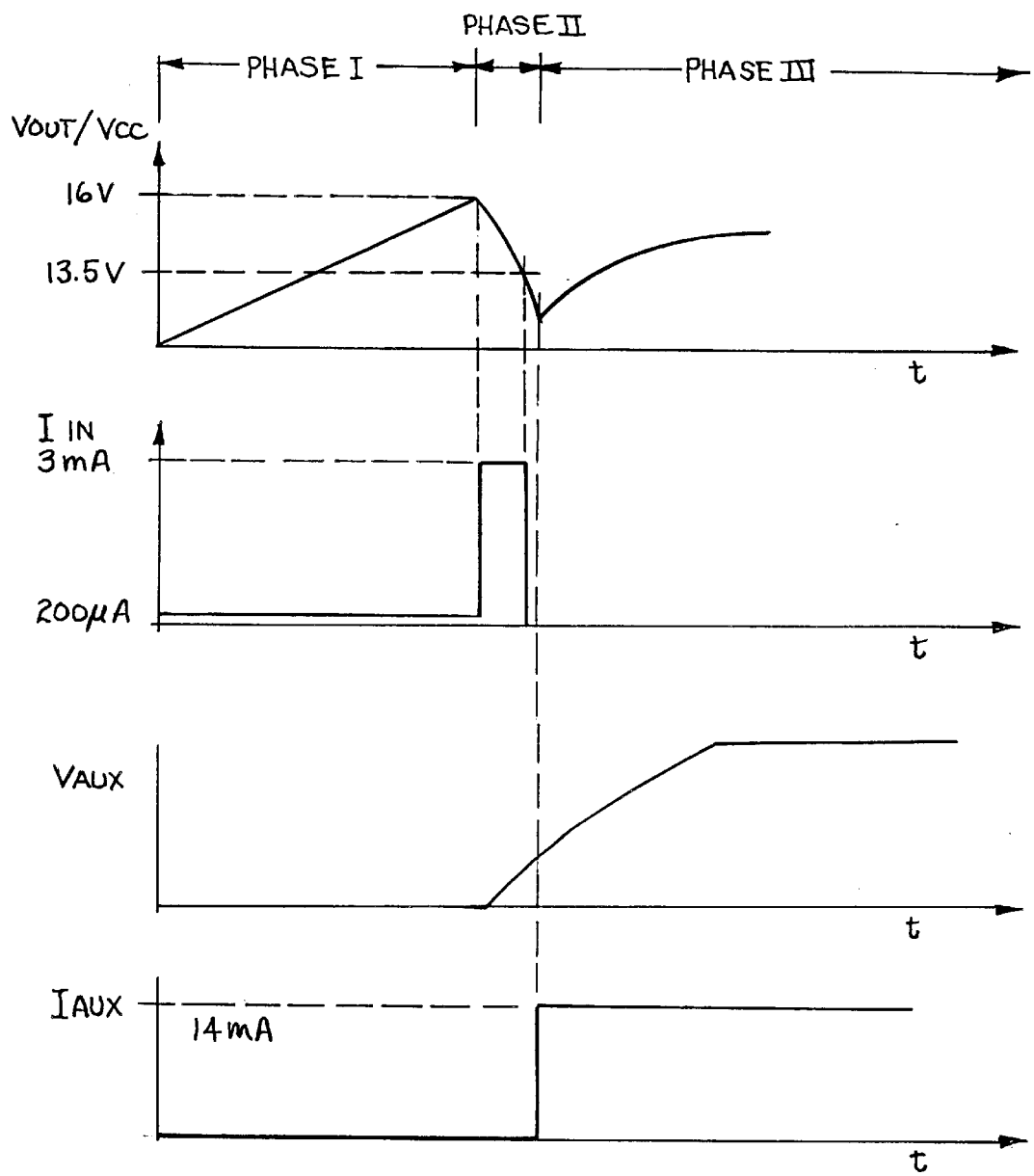
FIG. 3 shows voltage and current timing diagrams for the high voltage start-up circuit as implemented in a switchmode power supply as depicted in FIG. 2.

Referring to FIG. 3, voltage and current timing diagrams for the SMPS 40 depicted in FIG. 2 are shown. Phase I is when the SMPS 40 is at start-up. Phase II is when the PWM controller IC is operating but the SMPS 40 output has not settled. Phase III is when the SMPS output has settled.

While the invention has been particularly shown and described with reference to preferred embodiments thereof, it will be understood by those skilled in the art that the foregoing and other changes in form, and details may be made therein without departing from the spirit and scope of the invention.

I claim:

1. A high voltage start-up circuit for a switchmode power supply comprising, in combination:

switching means for turning off and on a high voltage input line of said start-up circuit and for limiting a current flow from said high voltage input line to an output of said start-up circuit;

comparator means coupled to said switching means for sending a signal to turn on said switching means when an output voltage of said start-up circuit falls below a first set value and for sending a signal to turn off said switching means when said output voltage falls below a second set value.

2. A high voltage start-up circuit in accordance with claim 1 wherein said comparator means comprises:

first comparator means coupled to said switching means for sending a signal to turn on said switching means when an output voltage of said start-up circuit falls below a first set value; and second comparator means coupled to said switching means for sending a signal to turn off said switching means when said output voltage falls below a second set value.

3. A high voltage start-up circuit in accordance with claim 2 further comprising trip point setting means coupled to said first and second comparator means for setting a value of said first set value and for setting a value of said second set value.

4. A high voltage start-up circuit in accordance with claim 3 wherein said trip point setting means comprises:

constant voltage source means coupled to said first and second comparator means for providing a reference voltage for said first and second comparator means; and resistor divider means coupled to said first and second comparator means for setting said first and second set values.

5. A high voltage start-up circuit in accordance with claim 4 wherein said resistor divider means comprises:
   a first resistor coupled to said first comparator means;
   a second resistor serially coupled to said first resistor; and
   a third resistor serially coupled to said second resistor.

6. A high voltage start-up circuit in accordance with claim 2 further comprising constant current source means coupled to said switching means for increasing a voltage output of said start-up circuit at a current limit set by said constant current source means until said output voltage is loaded with an external source greater than said constant current source.

7. A high voltage start-up circuit in accordance with claim 2 wherein said switching means comprises:
   first transistor means coupled to said high voltage input line for turning off and on said high voltage input line and limiting said current flow from said high voltage input line to an output of said start-up circuit;
   second transistor means coupled to said first transistor means for sending a signal to said first transistor means to turn off and on said first transistor means; and
   D flip flop means coupled to said first and second comparator means and to said second transistor means for sending a signal to said second transistor means to turn off and on said first transistor means.

8. A method of providing a high voltage start-up circuit for a switchmode power supply comprising the steps of:
   providing switching means for turning off and on a high voltage input line of said start-up circuit and for limiting a current flow from said high voltage input line to an output of said start-up circuit;
   providing comparator means coupled to said switching means for sending a signal to turn on said switching means when an output voltage of said start-up circuit falls below a first set value and for sending a signal to turn off said switching means when said output voltage falls below a second set value.

9. The method of claim 8 wherein said step of providing comparator means further comprises the steps of:
   providing first comparator means coupled to said switching means for sending a signal to turn on said switching means when an output voltage of said start-up circuit falls below a first set value; and
   providing second comparator means coupled to said switching means for sending a signal to turn off said switching means when said output voltage falls below a second set value.

10. The method of claim 9 further comprising the step of providing trip point setting means coupled to said first and second comparator means for setting a value of said first set value and for setting a value of said second set value.

11. The method of claim 10 wherein said step of providing trip point setting means further comprises the steps of:
   providing constant voltage source means coupled to said first and second comparator means for providing a reference voltage for said first and second comparator means; and
   providing resistor divider means coupled to said first and second comparator means for setting said first and second set values.

12. The method claim 11 wherein said step of providing resistor divider means further comprises the steps of:
   providing a first resistor coupled to said first comparator means;
   providing a second resistor serially coupled to said first resistor; and
   providing a third resistor serially coupled to said second resistor.

13. The method of claim 9 further comprising the step of providing constant current source means coupled to said switching means for increasing a voltage output of said start-up circuit at a current limit set by said constant current source means until said output voltage is loaded with an external source greater than said constant current source.

14. The method of claim 9 wherein said step of providing switching means further comprises the steps of:
   providing first transistor means coupled to said high voltage input line for turning off and on said high voltage input line and limiting said current flow from said high voltage input line to an output of said start-up circuit;
   providing second transistor means coupled to said first transistor means for sending a signal to said first transistor means to turn off and on said first transistor means; and
   providing D flip flop means coupled to said first and second comparator means and to said second transistor means for sending a signal to said second transistor means to turn off and on said first transistor means.

15. A high voltage start-up circuit for a switchmode power supply comprising, in combination:
   high voltage input line for supplying power to said start-up circuit;
   switching means coupled to said high voltage input line for turning off said high voltage input line by sensing a decrease in an output voltage of said start-up circuit;
   trip point setting means coupled to said switching means for resetting and turning on said high voltage input line; and
   current limiting means coupled to said high voltage input line for limiting current flow from said high voltage input line to an output of said start-up circuit.

* * * * *